April 23, 1935. H. HUEBER 1,998,762
WINDSHIELD WIPER CARRYING ARM
Filed April 18, 1932
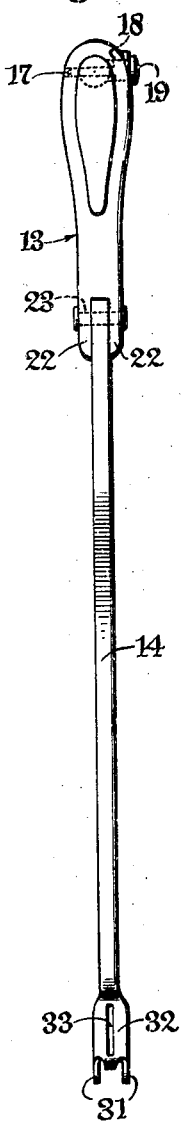
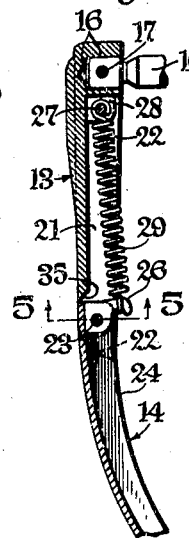
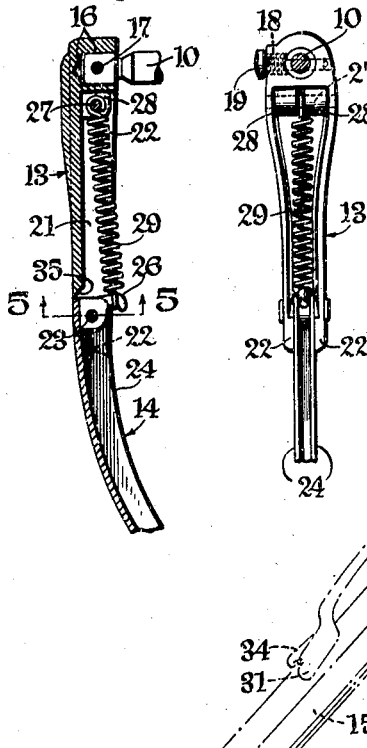
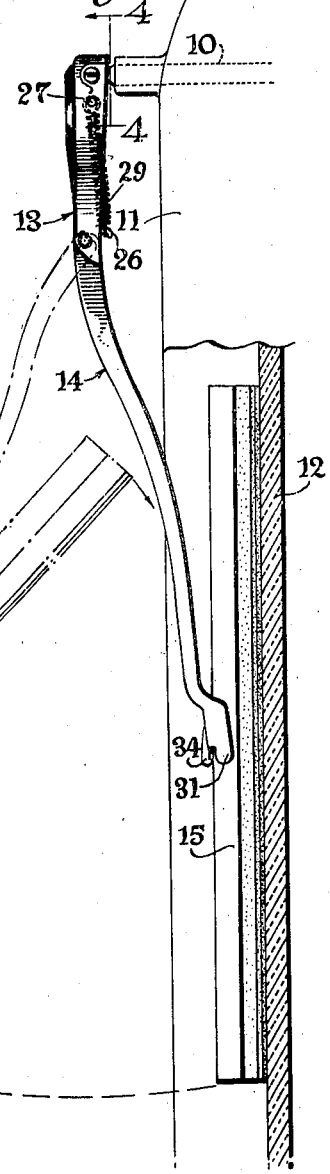
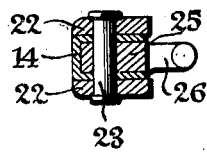
INVENTOR
Henry Hueber,
BY
Bean & Brooks. ATTORNEYS Patented Apr. 23, 1935

1,998,762

UNITED STATES PATENT OFFICE 1,998,762

WINDSHIELD WIPER CARRYING ARM

Henry Hueber, Buffalo, N. Y., assignor to Trico Products Corporation, Buffalo, N. Y.

Application April 18, 1932, Serial No. 606,031

5 Claims. (Cl. 15—255)

This invention relates to cleaners for the windshields of vehicles and especially to wiper arms for connecting the wiping blades and actuating elements of such cleaners.

Conventional windshield cleaners comprise a motor, and a wiper actuating part reciprocated by the motor and extending into adjacency with the windshield. The actuating parts are reciprocated across the windshield or are reciprocated angularly about an axis normal to the plane of the windshield. In both instances the motor and wiper actuating mechanism is usually disposed at one edge of the windshield in order not to impair vision therethrough, and an arm must be extended from the actuating part to the wiping blade.

The present invention comprehends an improved wiper carrying device, having a pair of sections hingedly connected, one section being secured to the actuating part of the cleaner and the other section, or arm, supporting the wiping blade. Resilient means are provided, acting upon and between the sections to urge such relative movement of them as will press the blade into contact with the windshield with sufficient wiping pressure that movement of the blade will clear the windshield of rain, snow and the like. The articulated or hinged connection of the sections will permit of movement of the blade away from the windshield, without detachment of the blade or the arm from the cleaner, to permit washing the windshield or cleaning the blade.

The invention further contemplates and provides a wiper carrying unit susceptible of economical manufacture and installation, and one which will have an appearance harmonious with the fittings and body design of modern motor vehicles; and still further has other objects and advantages which will become apparent to those skilled in the art from the following description of the typical embodiment illustrated in the accompanying drawing, wherein:

Fig. 1 is a side elevation of a wiper arm, assembled with the actuating part and the wiping blade, in operative relation with the windshield of a motor vehicle, the windshield appearing in vertical section, and the broken lines indicating the relative positions of the parts when the blade is swung outwardly, away from the windshield.

Fig. 2 is a front elevation of the wiper arm.

Fig. 3 is a vertical section through the upper portion of the arm showing its manner of engagement with the actuating member.

Fig. 4 is a section taken along line 4—4 of Fig. 1, showing the upper portion of the arm in rear elevation.

Fig. 5 is a section taken along line 5—5 of Fig. 3.

As shown in Fig. 1, the cleaner includes a shaft 10 journalled for oscillation about its axis in the header structure 11 above the windshield 12 of a vehicle. The wiper carrying device comprises a pair of rigid sections 13 and 14, the latter, or arm, having a wiper blade 15 detachably connected thereto in such manner that the blade may have limited movement about two relatively normal axes, as will be more fully pointed out hereinafter.

Member 13 is preferably die-cast, although it may be otherwise formed, and comprises an elongated casing having a well or recess 16 formed at one end for receiving the outer end of shaft 10. The latter has a diametral opening 17 therein, and the casing 13 has a threaded aperture 18 in alignment with the diametral opening. A screw 19 is threaded into aperture 18 and has a portion extended into the diametral opening, whereby the member 13 is rigidly secured to the shaft and will move with the latter as a part thereof.

The rear face of member 13 is recessed to provide a channel 21, and, at the end opposite the shaft 10, the side portions 22 are extended to provide a recess for receiving one end of the lower arm section 14. The latter is preferably of channel or U cross section with its concave surface exposed to the windshield. A pivot pin 23 is secured to and extends between the portions 22 of the upper section, through an opening formed in the side walls 24 of the arm 14. At the pivoted end of arm 14, in abutment with the inner walls thereof, is a block 25 having a hooked projection 26 extending rearwardly therefrom. The pivot pin 23 passes through the block and secures it against displacement from the arm section 14, the front wall of the latter preventing angular movement of the block about the axis of the pin.

A pin 27, secured to and extending between bosses 28 formed between the side walls and front wall of the end of member 13 adjacent the shaft, anchors one end of a tension spring 29. The other end of the spring is anchored to a projection 26 carried by the wiper arm 14. As the arm 26 constitutes a radial extension of the section 14 from the pivot axis, the spring will urge the section 14 about the pivot axis, in a counter-clockwise direction, as the device is illustrated, to press the wiper blade 15 into wiping contact with the windshield.

The wiper blade may be attached to the arm section 14 in any suitable manner. In the construction illustrated, the end portions 31 of the side walls of the member 14 are spread by widening the lower portion 32 of the forward wall to loosely receive the blade 15. A longitudinal slot 33 formed in portion 32 receives a hooked part 34 extended from the back of the blade. By this construction, the blade may move slightly from side to side, about the axis of the slot, as it is oscillated over the windshield surface by movement of the arm, and may have slight angular movement about an axis substantially normal to the axis of slot 33 and parallel to the windshield to permit the entire wiping edge of the blade to contact the windshield.

In normal operation of the cleaner, the spring 29, concealed within the recess 21 of member 13, will function to cause the arm 14 to press the blade 15 against the windshield. This action prevents the blade from becoming displaced and insures proper wiping action. In the event that it is desired to replace or clean the blade, or to wash the windshield, the arm section 14 may be swung away from the windshield about the axis of pivot pin 23, as indicated in broken lines in Fig. 1. In this position the blade may be readily attached or detached in the manner disclosed in the application of Erwin C. Horton and myself, Serial No. 488,528, filed October 13, 1930.

During normal operation of the cleaner, the arm sections 13 and 14 will move as a unit without appreciable angular movement, since the extended side wall portions 22, constituting the bifurcated end of member 13, extend a considerable distance beyond the pivot pin 23 in overlying relation to the arm section 14. As shown in Fig. 1, these portions 22 are rounded downwardly and rearwardly from the front face of member 13 to the rear face thereof.

The edge 35 of the front wall of member 13, adjacent arm 14, is substantially coincidental with the path traveled by the adjacent edge of arm section 14 in moving from the full to the broken line positions of Fig. 1, so that, in normal position, the forward surfaces of member 13 and arm 14 will present the appearance of a continuous and unbroken surface.

It will be understood that the embodiment described and illustrated is merely illustrative of the inventive principles involved, and that these principles may be applied to devices having other structural characteristics, all within the purview of this invention.

What is claimed is:

1. In a windshield cleaner, an actuating element, a member having one end connected to said element, said member having the other end thereof bifurcated, a channeled arm received in said bifurcated end, a pivot pin extending through the bifurcated end of the member and said arm part, a block seated in the channel of the arm and retained therein by said pin passing therethrough, said block having a projection for engaging a spring, a spring connected at one end to said projection and connected at the opposite end to said member, the latter having a recess for receiving the spring.

2. In a windshield cleaner, a wiper arm supporting shaft, a member having one end mounted upon said shaft and having a channel recess in the face thereof facing a windshield, a wiper carrying arm pivoted to the other end of the member for movement toward or away from the windshield, said arm having a projection extending from the pivot axis toward the windshield, and a tension spring in the recess having one end connected to the projection and the other end connected to said member for urging movement of the arm about the pivot axis toward the windshield.

3. A windshield wiper carrying arm comprising a section having a front wall and spaced side walls extending beyond one terminal edge of said front wall, another section seated between said side walls and pivoted thereto for movement about an axis parallel to said front wall and transversely of said sections, the front faces of said sections being substantially flush and continuous when said sections are in normal operative relation, and said terminal edge being formed so that the distance from any portion thereof to the pivot axis is at least as great as the distance from the pivot axis to the juncture of the front faces of said sections when in normal operative relation.

4. A windshield wiper carrying arm comprising a section having a recess in the rear and lower faces thereof, another section having an end portion seating in the recess in the lower face of the first mentioned section and pivoted to said section about an axis substantially parallel to the front faces of said sections and transversely thereof, said other section having a projection extending into the recess in the rear face of the first mentioned section, and a spring in said recess in the rear face anchored at one end to said projection at a point rearward of the first axis and at the other end to the first mentioned section adjacent the upper end thereof.

5. In a wiper blade carrying arm, a pair of substantially rigid members, the first member having a channel in one face thereof, a pivot pin extending through said first member across the channel thereof, said pin pivotally connecting said members, a block seated in said channel and having an opening receiving said pivot pin, said block having a spring engaging portion eccentric to the pin, and spring means being anchored to the second member and engaged with said spring engaging portion for urging relative movement between said members about the axis of the pin.

HENRY HUEBER.